Jan. 13, 1942.    B. L. BOBROFF    2,269,512
SWITCH CONSTRUCTION FOR AUTOMOTIVE VEHICLES
Filed Sept. 22, 1938
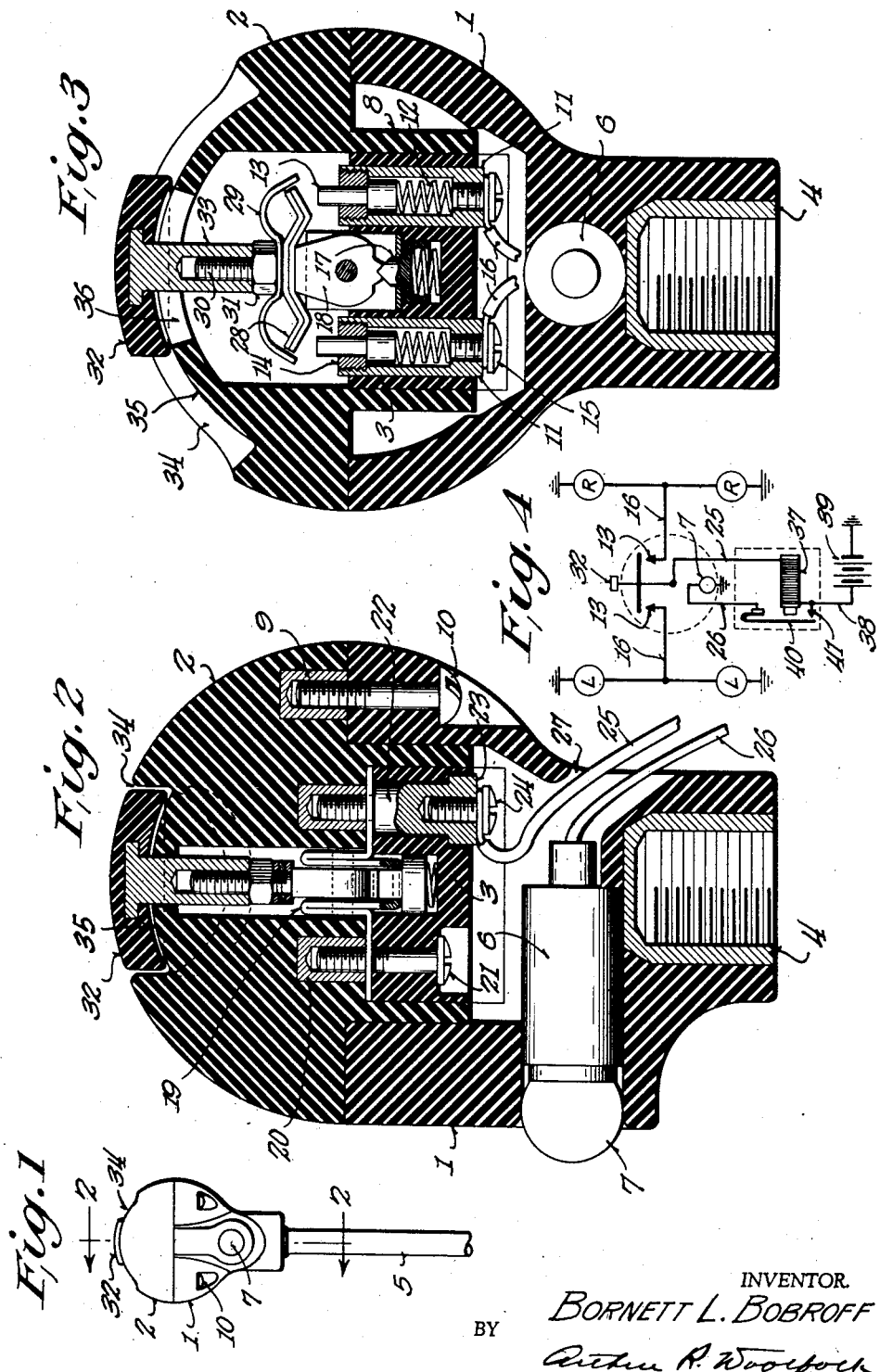
INVENTOR.
BORNETT L. BOBROFF
BY
Arthur R. Woodcock
ATTORNEY.

Patented Jan. 13, 1942

2,269,512

UNITED STATES PATENT OFFICE 2,269,512

SWITCH CONSTRUCTION FOR AUTOMOTIVE VEHICLES

Bornett L. Bobroff, Racine, Wis.

Application September 22, 1938, Serial No. 231,095

6 Claims. (Cl. 200—59)

This invention relates to a switch construction for automotive vehicles and is particularly directed to a signal switch construction.

Objects of this invention are to provide a novel form of signal switch which is carried by the gear shift lever and which is utilized as the knob of the gear shift lever without operating the switch if so desired or which may be operated either while the gear shift lever is being used or while it is in a stationary position to give a right or left signal as required by rocking a control member or button to the right or left in accordance with the desired signal.

Further objects are to provide a novel form of signal switch in which means, including a pilot light, is provided which is so constructed that if either the front or rear signal lights for either signal should burn out, the pilot light will not light, thus giving a definite assurance to the operator of the integrity of the system whenever he operates the switch and observes the lighting of the pilot light.

Further objects are to provide a signal switch construction which is so made that the parts may be very easily assembled without requiring the operator to work in a confined or cramped space, but in which the parts may be assembled in an easy and simple manner so that the switch forms a unit completely assembled that may be connected to the body portion with ease and without disturbing the arrangement of the switch unit, as the switch unit may be handled as a unitary structure after it has been completely assembled.

Further objects are to provide a signal switch construction which is reliable in operation, in which means are provided so that any wear on any of the parts of the switch, such, for example, as on the spring contact leaves or plunger contacts, or anywhere in the bearing of the rocking member of the switch, will be compensated for, and in which secure and adequate contact will be assured even after a long period of use and even though wear may occur.

In brief, objects of this invention are to provide a novel form of signal switch for automotive vehicles which will not get out of order from wear and which will always apprise the operator of any burning out of any signal lamp when he attempts to give his signal so that he will be immediately apprised of the state of the system.

Further objects are to provide a signal switch construction in which a very few parts are employed, in which the operating button or member normally closes the slot through which the rock lever or stem passes, and in which relatively heavy shielding members are provided over the switch contacts so that unauthorized tampering of the switch cannot be readily made, as these relatively heavy shielded members protect the switch parts against tampering.

In greater detail, objects of this invention are to provide a signal switch construction for automotive vehicles in which the major part of the apparatus is formed by molded insulating material which may be readily molded to shape, in which there is a base section which receives a detachable knob like top section, the knob like top section removably receiving a switch section which carries the stationary contacts of the switch, the rocking switch lever being carried by means held between the switch section and the top section, the switch section and the top section forming together a unitary switch structure which may be fully assembled prior to the adjoining of the knob like top section with the base section, thus giving great freedom and ease in assembling and also materially simplifying the construction.

An embodiment of the invention is shown in the accompanying drawing, in which:

Figure 1 is a view of the switch assembled and mounted on the shift lever.

Figure 2 is a sectional view on the line 2—2 of Figure 1.

Figure 3 is a sectional view taken at right angles to Figure 2.

Figure 4 is a diagrammatic view of the system.

Referring to the drawing, it will be seen that the switch construction comprises a base member or bottom section 1, a knoblike or rounded top section 2, and a switch section 3 which is received by the top section 2. These three sections constitute the main portion of the switch and are each formed of molded insulating material, such as a molded phenolic condensation compound. The base or bottom section 1 has molded therein the metal screw threaded socket 4 which is adapted and designed to be screwed upon the shift lever 5. It is in contact with the metal casing 6 of a pilot light 7, the pilot light itself being removable but the metal casing 6 or socket portion for the light being molded in place in the bottom section 1.

The top section 2 is provided with a downwardly projecting portion 8 which fits within the bottom section, as shown in Figures 2 and 3. The top section 2 has molded therein a plurality of threaded socket members 9 for the reception of the screws 10 which extend upwardly through the base section into the threaded sockets 9.

The downwardly projecting portion 8 of the top section 2 centers and positions such top section with reference to the base and is readily attached to the base and detached therefrom by means of the screws 10.

The switch section 3 is provided with plunger socket members or guide members 11 molded therein and are each provided with a central cavity for the reception of springs 12 which bear against the heads of the stationary contacts or plungers 13, a suitable threaded collar 14 being provided to prevent the plungers 13 of the stationary contacts from passing outwardly from the socket or guide members 11. The lower ends of these sockets or guide members 11 receive the terminal screws 15 which attach the wires 16 hereinafter described.

The switch section 3 is also provided with a spring pressed, notched locking plunger 17, as shown in Figure 3, which cooperates with any one of the three notches formed in the bottom of the switch lever 18 hereinafter described so as to releasably hold the switch lever in its neutral position under normal conditions, as shown in Figure 3, or either its right or left position when it has been rocked to give the right or left signal.

The switch lever 18 is pivotally carried between the upwardly folded lugs 19 of the switch lever contact strap. This contact strap is shown most clearly in Figure 2 and it is clamped in position between the switch section 3 and the top section 2. This switch lever contact strap is apertured so that the plunger 17 can pass therethrough.

Screws are provided on opposite sides to hold the switch section 3 to the top section 2 and to clamp the contact strap or switch lever supporting member in place between the sections 3 and 2. Each of the screws is received by threaded socket members 20 molded in the top section 2. The screws 21 may extend directly upwardly through the switch section 3 to the socket member 20 and may be headed to clamp the switch section 3 in place. The other screw, however, is provided with a reduced threaded shank at its upper end and with an intermediate larger shank portion 22 which forms a shoulder bearing against the supporting member for the switch lever.

The lower end of the shank 22 is preferably provided with a head like portion 23 which engages an annular shoulder formed on the switch section 3 and acts like the head of a screw to assist in holding the switch section 3 in clamped relation to the top section 2. The enlarged shank 22 is threaded and receives the terminal screw 24 by means of which the conductor 25 is attached and thereby electrically connected to the switch lever 18.

A conductor 26 extends to the pilot light 7 and the conductors 25 and 26 may extend through an opening 27 formed in the base portion or bottom section 1. It is to be noted that this opening is on the side opposite the pilot light 7 and away from the operator.

Referring to Figure 3 it will be seen that the movable switch blade 28 is formed of a plurality of leaf spring contacts and that a relatively heavy shield member 29 having arched portions is provided with the arched portions overhanging the projecting leaves of the switch arm 28. The switch lever 18 is provided with a threaded stem 30 which receives the nut 31 that clamps the shield member 29 and the composite switch blade 28 in place against the shouldered upper end of the switch lever 18.

The switch is operated by means of the operating member or button 32 which may be rocked from side to side to thus rock the switch. This button has molded therein a metal shank 33 which is screwed onto the threaded shank 30 of the switch lever and thus locks the button in place. The button is given a recessed lower surface and is positioned within a transverse recessed part 34 of the top section 2 and may be rocked back and forth in this recessed portion. The bottom face 35 of this recessed portion is spherical so as to allow the free rotation of the button 32 when it is screwed onto the switch lever. Additionally the button 32 normally covers the slot 36 formed in the top section 2, such slot being provided to accommodate the rocking arm 33 which forms a portion or continuation of the switch lever. However, when the button is rocked to one side or the other, a portion of the slot may be uncovered depending, of course, upon the size of the button. Even under these conditions, no one can tamper with the switch blade 28 or with the stationary contacts 13 on account of the heavy shield member 29 which forms a protecting means therefor.

Relay means are provided for controlling the pilot light or telltale light 7. This relay means may consist of an electromagnet 37, one side of which is connected to the conductor 25 and the other side of which is connected to the live lead 38 of the battery 39, the other side of the battery being grounded in the usual way. The armature 40 of the electromagnet or relay is spring urged outwardly and is drawn into contact with the stationary contact 41 when the electromagnet 37 is energized by current flowing to each of the two right or left signal lights. The adjustment of the spring or tension of the armature 40 is such that it will not respond when current flows only to one of the pair of signal lights and thus the pilot light will not light unless both of the signal lights are intact.

The disclosure shows the relay means as a separate entity located outside of the switch body portion. However, it is within the province of this invention to mount it within the switch body portion. For example, it may be mounted within the portion 6 of the socket for the pilot light, in which event only one wire 38 would lead from the switch to the battery.

It will be seen that a combined signal switch and shift gear operating handle has been provided by this invention so that the shift gear may be operated in the usual manner without operating the switch, in which the switch may be operated without operating the shift gear, and in which both the switch and shift gear may be simultaneously operated if so desired.

It will be seen further that the active switch parts may be completely assembled with the top and the switch section removed from the base section so that the assembling of the parts may be conducted with ease.

It is to be noted further that there are very few parts which constitute this switch construction and that these parts are not delicate nor are they easily disturbed.

Further it is to be noted that the switch is so made that if wear occurs at the bearing for the switch lever or in the plungers, the switch blade, or any other parts of the switch, that contact will still be made as the spring pressed plungers will compensate for the wear.

Although this invention has been described in considerable detail, it is to be understood that such description is intended as illustrative rather than limiting, as the invention may be variously embodied and is to be interpreted as claimed.

I claim:

1. A signal switch for an automotive vehicle having a control lever, said signal switch comprising a base section having means for attachment to a control lever, a top section constituting with said base section the operating handle for said control lever, and a switch section carried wholly by said top section, means for securing said top and base sections together, and signal switch mechanism carried by said switch section and including an interiorly located rocking means and a rock lever projecting through said top section and having a manipulating member accessible exteriorly of said top section for operating said switch mechanism said rock lever and said rocking means having cooperating interlocking means and said rock lever being insertable from the upper side of said top section and being interlocked to said rocking means after said insertion.

2. A signal switch for an automotive vehicle having a control lever, said signal switch comprising a base section having means for attachment to a control lever, a top section constituting with said base section the operating handle for said control lever, and a switch section carried wholly by said top section, means for detachably securing said top and base sections together, and signal switch mechanism carried by said switch section and including an interiorly located rocking means and a rock lever projecting through said top section and having a manipulating member accessible exteriorly of said top section for operating said switch mechanism, said top section and said switch section and switch mechanism being assembled as a unit and being removable as a unitary structure from said base section, said rock lever and said rocking means having cooperating interlocking means and said rock lever being insertable from the upper side of said top section and being interlocked to said rocking means after said insertion.

3. A signal switch for an automotive vehicle having a control lever, said signal switch comprising a base section having means for attachment to a control lever, a top section constituting with said base section the operating handle for said control lever, and a switch section carried wholly by said top section, means for detachably securing said top and base sections together, and signal switch mechanism carried by said switch section and including a rock lever projecting through said top section and having a manipulating member accessible exteriorly of said top section for operating said switch mechanism, said top section and said switch section and switch mechanism being assembled as a unit and being removable as a unitary structure from said base section, said switch mechanism having conductor receiving terminal members accessible from the under side of said switch section when said top section and said switch section are removed as a unit from said base section.

4. A signal switch for an automotive vehicle having a control lever, said signal switch comprising a base section having a metallic insert for attachment to said lever and constituting a ground connection, said base section having an opening therein, a pilot light having a metal socket carried within said opening and held in contact with said insert, a top section secured to said base section, and a switch section including signal switch mechanism for controlling signal lights and being operatively associated with said pilot light, said switch mechanism including a rock arm projecting through said top member for operating said switch mechanism and having a manipulating member located exteriorly of said top section.

5. A signal switch for an automotive vehicle comprising a body portion, switch mechanism enclosed by said body portion and including a pair of stationary contacts having spring pressed contact plungers, a rocking switch lever having contact arms for selective engagement with said contact plungers, an operating arm extending from said switch lever and projecting outwardly from said body portion and terminating in a handle portion, and means for temporarily locking said switch lever when either contact arm is in engagement with its corresponding contact plunger.

6. A signal switch for an automotive vehicle comprising a ball like body portion having a channel therein whose bottom surface is substantially spherical, switch mechanism enclosed by said body portion and including a pair of stationary contacts having spring pressed contact plungers, a rocking switch lever having contact arms for selective engagement with said contact plungers, and an operating arm extending from said switch lever and projecting outwardly from said body portion and terminating in a handle portion, said handle portion having its inner side concave and substantially conforming to the spherical surface of the bottom of said channel, said handle portion being positioned within the channel.

BORNETT L. BOBROFF.